April 22, 1969        C. F. HARRIS        3,439,430
ARC-MEASURING GAUGE FOR USE WITH CYLINDRICAL OBJECTS
Filed June 8, 1966        Sheet 1 of 3
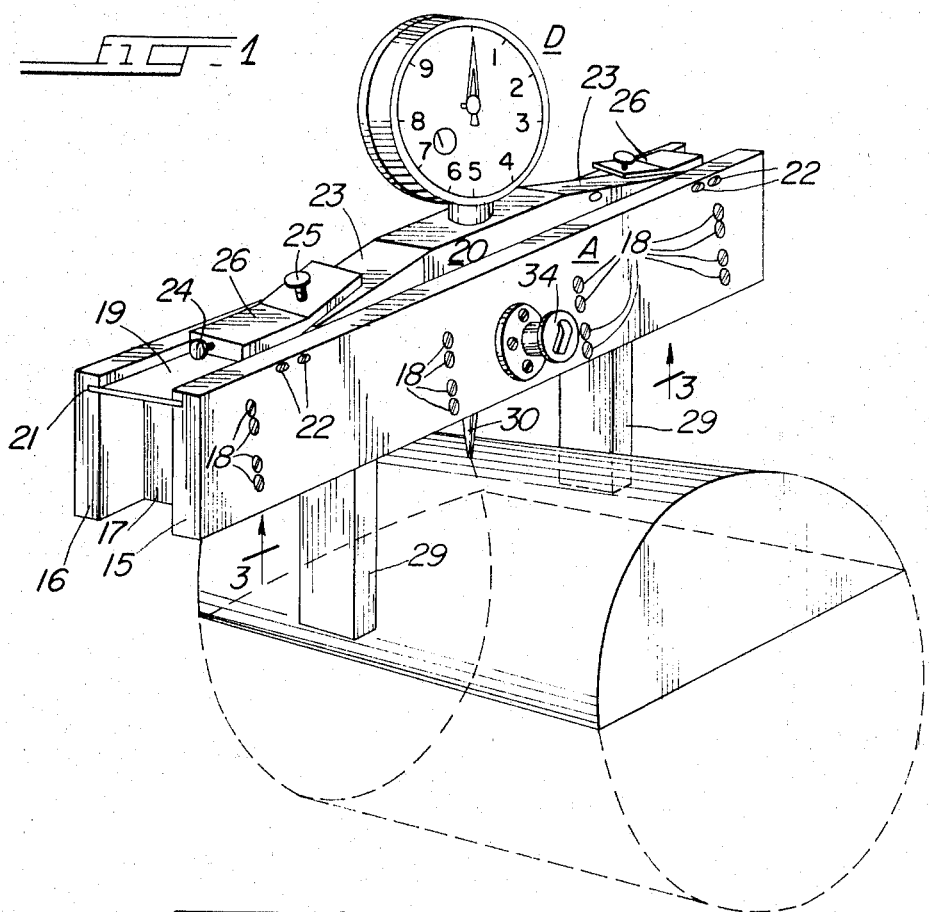
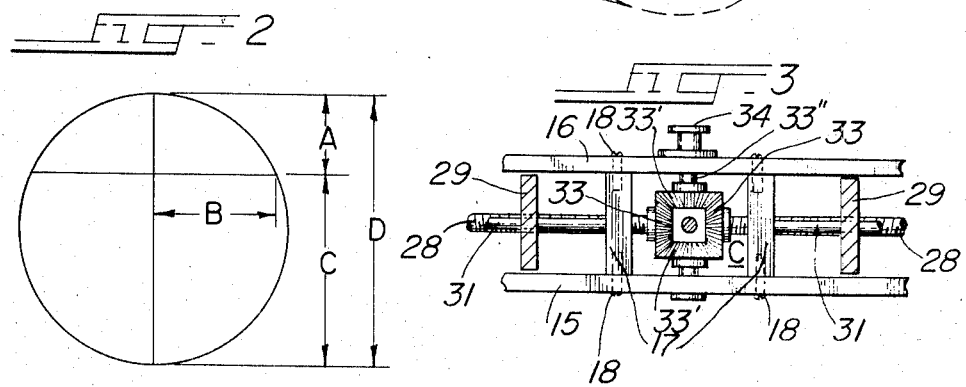
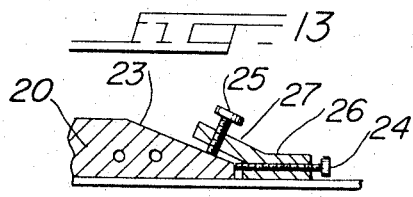
INVENTOR.
CHARLES F. HARRIS April 22, 1969  C. F. HARRIS  3,439,430
ARC-MEASURING GAUGE FOR USE WITH CYLINDRICAL OBJECTS
Filed June 8, 1966  Sheet 2 of 3
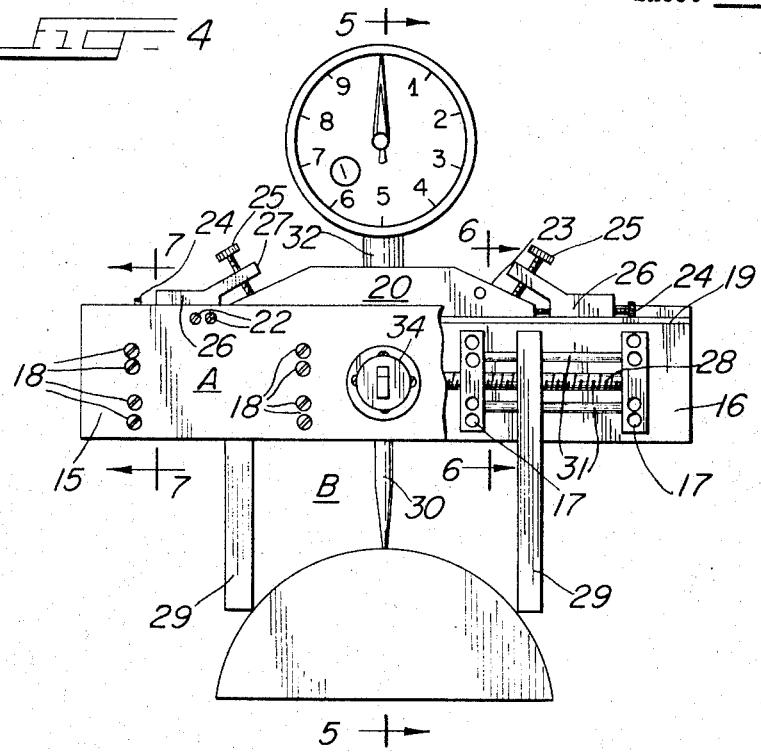
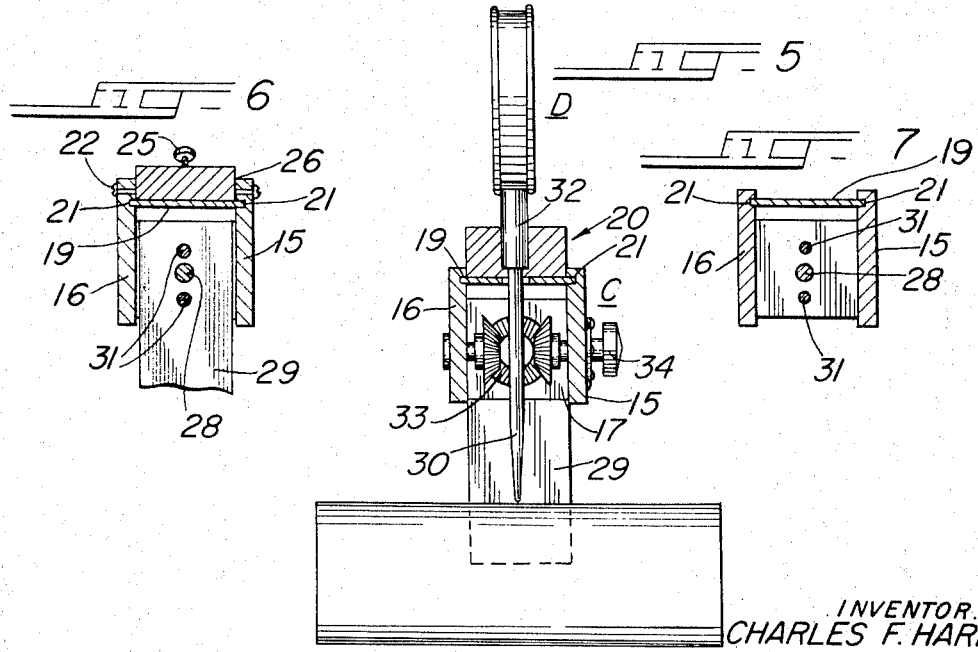
INVENTOR.
CHARLES F. HARRIS April 22, 1969 C. F. HARRIS 3,439,430
ARC-MEASURING GAUGE FOR USE WITH CYLINDRICAL OBJECTS
Filed June 8, 1966 Sheet 3 of 3
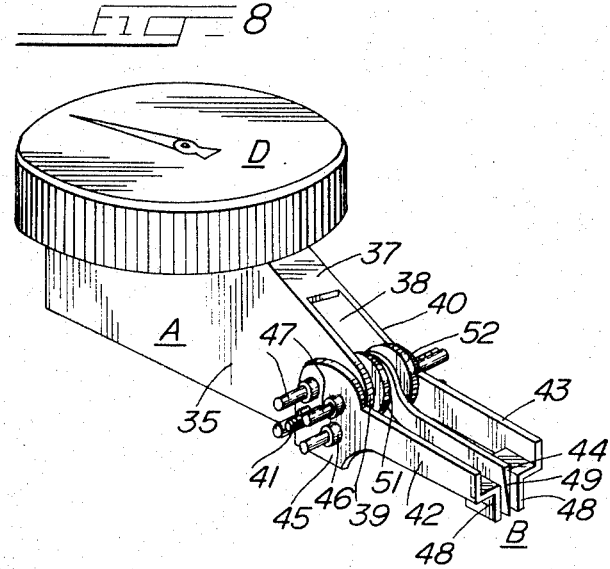
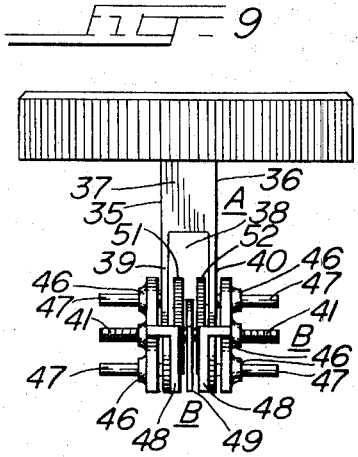
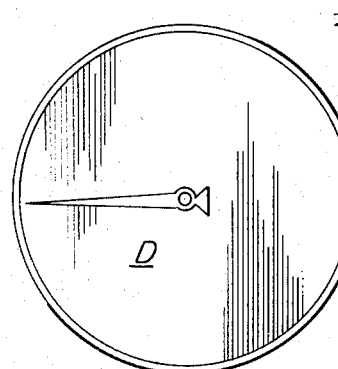
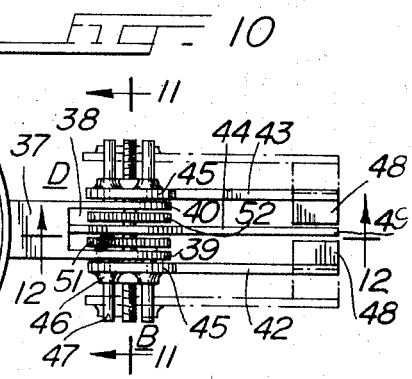
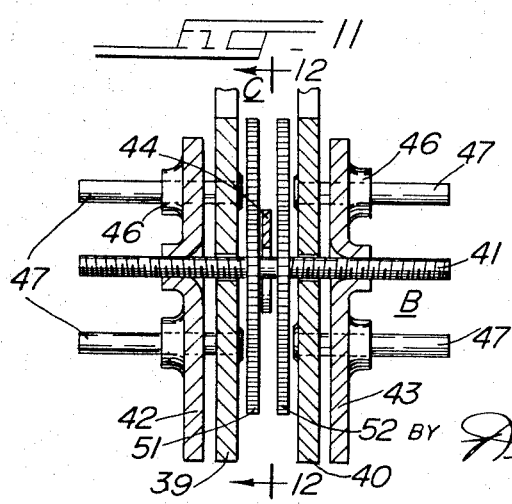
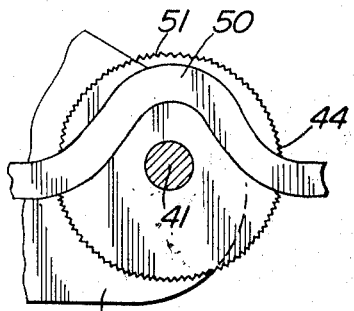
INVENTOR.
CHARLES F. HARRIS

United States Patent Office 3,439,430
Patented Apr. 22, 1969

3,439,430
ARC-MEASURING GAUGE FOR USE WITH
CYLINDRICAL OBJECTS
Charles F. Harris, 2717 Hampton Court,
Chicago, Ill. 60614
Filed June 8, 1966, Ser. No. 556,190
Int. Cl. G01b 3/24
U.S. Cl. 33—178                                                3 Claims

ABSTRACT OF THE DISCLOSURE

An arc-measuring gauge having a primary support mounting three spaced parallel stems two of which stems are reciprocably supported on the frame and respectively embracing oppositely-threaded portions of a rotative shaft element at opposite sides of the axially-shiftable intermediate stem, the shaft element being oppositely rotatable on the frame for simultaneously varying the equidistant spacing of the two legs relative to the stem including adjustable means for fixedly centering the third stem on the frame.

---

This invention relates to improvements in radius gauges.

The main objects of this invention are: to provide the improved structuring of a gauge for use in measuring the radius of variously-sized cylindrical objects; to provide a gauge of this kind having an improved mounting and mechanism for adjusting the spacing of a pair of stems relative to an intermediate stem connected to actuate a registering indicator; to provide the improved structuring of gauges of this kind for use respectively with either large or with small diameter cylindrical objects; and to provide alternative gauges of this kind each so structured as to make reasonably economical the manufacturing and marketing thereof and highly facile and satisfying the use thereof.

In the two adaptations shown in the accompanying drawings:

FIG. 1 is a perspective "in use" view of one adaptation of a gauge constructed in accordance with this invention showing the device measuring the accuracy of a radius of a cylindrical surface;

FIG. 2 is a diagram indicating the dimensions of several spans of a cylindrical object which are used to determine by such a gauge, resting on the surface of the object, the factors of which are parts of a conventional trigonometrical equation;

FIG. 3 is a much-reduced, partial, bottom-plan view of the gauge taken on the plane of the line 3—3 of FIG. 1;

FIG. 4 is a somewhat reduced front face view of what is shown in FIG. 1;

FIG. 5 is a vertical sectional view of what is shown in FIG. 4 taken on the plane of the line 5—5 of that figure;

FIG. 6 is a fragmentary, sectional view taken on the plane of the line 6—6 of FIG. 4;

FIG. 7 is a fragmentary, sectional view taken on the plane of the line 7—7 of FIG. 4;

FIG. 8 is a perspective of an arc-gauge adapted for use in determining the measurements of an object much too small for use with the gauge as shown in these prior figures;

FIG. 9 is a front end elevational view of what is shown in FIG. 8;

FIG. 10 is a plan view of the gauge as shown in FIGS. 8 and 9;

FIG. 11 is an enlarged, fragmentary, sectional view taken on the plane of the line 11—11 of FIG. 10;

FIG. 12 is a much-enlarged view of one of the adjusting wheels of the adaptation of FIG. 8, as viewed from the plane of the line 12—12 of FIG. 11; and FIG. 13 is a greatly enlarged, fragmentary, sectional view of one end of the block and cooperative adjusting pad.

A radius gauge embodying the foregoing concept comprises, in general, a supporting frame A, a set of three vertical extending stems B, a manually operable adjusting mechanism C, and a registering indicator D operable by the center stem. Two structural modifications of such an improved gauge are shown in the drawings; one for use with a relatively large radius and the other for use with a relatively small size radius.

For a gauge of this kind, adapted for use with a reasonably large-diameter radius, as shown in FIGS. 1–7, the frame A comprises a pair of rectangular plates 15 and 16 fixed in spaced parallel disposition by two pairs of transversely-disposed members 17 secured by screws 18 to and between the opposed faces of the plates 15 and 16, and mounting a platform 19 whereon a block 20 is adjustably supported and a pair of adjusting pads 26.

The transverse members 17 are arranged in spaced pairs on respectively opposite sides of the transverse median of the frame A (see FIG. 4).

The platform 19, as herein shown, is a metal plate seated in slots 21 inwardly below the upper faces of the frame plates 15 and 16.

The block 20, as here shown, is of rectangular contour with oppositely slanting ends 23 and is securely held between the plates 15–16 by set screws 24 and 25. Such a block 20 is secured in an adjustable position on the platform 19 by pairs of set screws 24 and 25 in the respective pairs of pads 26 adjustably and frictionally mounted on the platform 19 and between the plates 15–16. As will be noted from FIG. 13, these pads 26 have inwardly and upwardly inclined arms 27 the under faces of which are substantially parallel with the slanted ends of the block 20. The pair of set screws 24 permit shifting the block 20 on the platform 19 to ensure the required relationship between the triple stems C. The pair of set screws 25 serve to press the block 20 into firm contact against the platform 19, once it has been adjusted to fix its required positioning on the platform. Once set the block 22 is anchored by set screws 22.

The triple set of stems B, for the adaptation of FIGS. 1–7, comprises a pair of rectangular legs 29 and an intermediate stem 30.

Each of the pairs of legs 29 are dependingly supported on one of the threaded shafts 28 and on one of the pairs of spaced parallel guide rods 31 spanning and anchored at their ends to the respective pairs of spaced transverse members 17 located on the opposite sides of the transverse median of the frame A. The legs 29 are each shiftably supported on the respective pairs of rods 31 secured to the respective pairs of members 17 at opposite sides of the transverse median of the frame A. Each shaft 28 is rotatively journaled in the respective pairs of legs 17. The threads on these respective shafts are right and left hand type respectively and the legs 29 are oppositely threaded to match the threads on the opposed shafts 28, whereby when the shafts 28 are rotated the legs will move simultaneously toward or away from each other, depending on the direction of rotation of the handle structure 34.

The intermediate stem 30 is cylindrical and shiftably supported in a sleeve 32 set in the block 20. At its inner (or upper) end the stem 30 is connected in a conventional manner to actuate a shaft (not shown) for shifting the pointer on the registering indicator D.

The adjusting mechanism C for the adaptation of FIGS. 1–7 comprises a conventional four-piece bevel-gear unit (FIG. 3). One set of opposed pair of gears 33 is keyed to the inner ends of the opposed shafts 28. The other pair of gears 33' is journaled on the respective plates 15 and 16. A hand-operating knob 34 is journaled on the end of one of the frame plates (15 of FIG. 1) and keyed to the shaft 33″ of one of the gears 33′.

The register indicator D is a conventional instrument such as used on other prior types of arc-measuring gauges. The housing is integrated with the sleeve 32.

For a gauge of this kind, adapted for use with very small-diameter, cylindrical objects, as shown in FIGS. 8–12, the frame A is an inverted U of sheet-material, preferably metal, comprising parallel walls 35 and 36 and a base part 37. A portion of this base part 37 is inclined forwardly downwardly, and has a slot 38 therein defining a pair of forwardly-extending and spaced arms 39 and 40.

The rotatable shaft 41 for this adaptation of FIGS. 8–12, is a threaded rod journaled on and transversely of the forward extremities of the arms 39 and 40. Oppositely outward from the median thereof the shaft 41 is oppositely threaded, that is, one side contains left hand threads and the other side right hand threads.

The triple set of stems B comprises a pair of legs 42 and 43 and an intermediate stem 44. All of these are formed from flat steel material, preferably metal.

The narrow stem parts 42 and 43 are disposed forwardly from their pads 45 and are integral therewith. Each pad 45 is formed with five hubs 46. Such stem parts are slidably mounted on a plurality of oppositely-extending guide rods 47 secured at their inner ends to the respective arms 39 and 40 slidable in four of the hubs 46. At their outer ends the stem parts 42 and 43 have integrated, narrow, angle-shaped extensions providing offsets 48 disposed inwardly toward each other and downwardly whereby the downwardly extending portions are disposed parallel with the planes of the main portions of the respective parts 42 and 43.

The intermediate stem part 44, likewise, is a flat strip interposed medially between the arms 42 and 43. Such stem part 44 extends rearwardly into the frame A. An intermediate portion of the stem part 44 is formed with a hump 50 to span the shaft 41 (FIG. 12). At its inner end the intermediate stem part 44 is connected in a conventional manner to a shaft (not shown) for shifting the pointer on the registering indicator D. The fifth or center hub 46 is internally threaded to match the threads of the respective shafts 41, whereby rotation of the shafts 41 will simultaneously shift the pads away from or toward the forward ends of arms 39–40, thus simultaneously shifting the legs 42–43 similar to the embodiment described in FIGS. 1–7.

The adjusting mechanism C for this adaptation of FIGS. 8–12, comprises a pair of disks 51 and 52 keyed medially on the threaded shaft 41 and intermediate the legs 39 and 40. The diameter of the disks 51 and 52 is large enough to dispose their knurled peripheries above and forwardly outward of the arms 39 and 40.

The register indicator D, for this adaptation of FIGS. 8–12, is a conventional instrument such as is used on other types of gauges.

The use of either of the adaptations above explained and shown in the drawings, is essentially the same, when used on the different sizes of cylindrical objects.

Depending upon the radius measurement that is desired, the adjusting mechanism C (respectively 33–34 inclusive or 51–52) is operated to effect the desired spacing between the pair of legs (29 or 42–43). The inner opposed edges of the respective legs (29 or 42–43) contacting the periphery of the cylindrical object being tested, as best shown in FIG. 4. Thereupon, the properly adjusted intermediate pin (30) equidistant between the legs 29, the free ends or points of the stems (30–49) will contact the periphery of the cylindrical object at a point exactly intermediate the contact of the pair of stem parts (29 or 42–43). The upward retraction of intermediate stem part (30, 44) will actuate the indicating register D to register the dimension of the chord between the points of contact of the pairs of legs (29 or 42–43) with the periphery of the cylindrical object. Thus if there is any inaccuracy the needle in the gauge will deflect as shown in FIG. 4. As shown in FIG. 4, there are no inaccuracies.

The mathematical consideration whereby these several dimensions are obtainable is $$A:B::B:C$$

and which may be factored as follows:

$$\frac{A}{B}=\frac{B}{C}$$

$$A=\frac{B^2}{C}$$

$$C=\frac{B^2}{A}$$

$$B\sqrt{AC}$$

Example:

$$A=.7500''$$
$$B=2.000$$
$$B^2=4.000$$
$$C=B^2/A=4/.75=5.3333$$
$$C+A=6.0833=D$$

It is to be understood that numerous details may be altered or omitted without departing from the spirit of this invention as defined by the following claims.

I claim:
1. A gauge for measuring the accuracy of the arc of a chord of a cylindrical object comprising,
 (a) a supporting frame in the form of a pair of rectangular plates fixed in spaced parallel relationship by at least a pair of transverse members spaced an equal distance opposite the transverse median of the frame,
 (b) a flat platform fixed transversely between the pair of plates directly below the upper edges thereof,
 (c) a shaft journaled on the transverse members inwardly below the platform and having opposite threads extending oppositely outward from the transverse median of the frame,
 (d) a pair of guide rods fixed between the plates on the transverse members in spaced parallel relationship and on opposite sides of the shaft equally opposite the transverse median of the frame,
 (e) a pair of legs of rectangular form depending from and shiftably supported on the respective pairs of rods equally opposite the transverse median of the frame, and having threaded apertures therein respectively embracing the opposite threads on the shaft,
 (f) a block shiftably supported on the platform medially longitudinally and transversely thereof,
 (g) a registering indicator fixed centrally on the block,
 (h) a stem depending from the indicator equi-distant between the pair of stems and connected to actuate the indicator,
 (i) gearing journaled intermediate the pair of plates and connected to actuate the shaft, and
 (j) a knob journaled on the frame exteriorly thereof and connected to the gearing for the manual actuation of the shaft through the gears for simultaneously altering the spacing of the pair of legs from the stem.
2. The device as set forth in claim 1 wherein
 (k) a pair of adjusting pads fixed on the platform outwardly adjacent the opposite ends of the block,
 (l) a pair of set screws set in the respective ends of the block and axially aligned parallel with the face of the platform and operable to engage the ends of the block for centering the stem precisely intermediate the pair of legs, and
 (m) another pair of set screws set in the ends of the block and operable to contact the block to secure its adjusted position on the platform.

3. The device as set forth in claim 1 wherein the block is formed with oppositely tapering ends and (n) a pair of pads fixed on the platform outwardly adjacent the opposite tapered ends of the block and with under face parts parallel with the tapered ends of the block, (o) a first pair of set screws mounted in the ends of the pair of pads and operable to engage the block for centering it on the platform, and (p) a second pair of set screws mounted on the pads normal to the plane of the tapered ends of the block and operable to contact the tapered ends of the block to secure the centering of the stem precisely intermediate the pair of legs.

References Cited

FOREIGN PATENTS 399,007  10/1942  Italy.

SAMUEL S. MATTHEWS, *Primary Examiner.*